United States Patent [19]

Gerstl

[11] 4,137,026

[45] Jan. 30, 1979

[54] BRICKMAKING PRESS

[75] Inventor: Rudolf Gerstl, Vienna, Austria

[73] Assignees: Veitscher Magnesitwerke-Actien-Gesellschaft, Vienna; Oesterreichisch-Amerikanische Magnesit Aktiengesellschaft, Radenthein, both of Austria

[21] Appl. No.: 819,567

[22] Filed: Jul. 27, 1977

[51] Int. Cl.[2] ............................ B22F 3/04; B29B 5/02

[52] U.S. Cl. .................................. 425/78; 425/405 H

[58] Field of Search .............................. 425/405 H, 78

[56] References Cited

U.S. PATENT DOCUMENTS

| | | | |
|---|---|---|---|
| 2,152,738 | 4/1939 | Jeffery | 425/405 H X |
| 3,044,113 | 7/1962 | Gerard et al | 425/405 H X |
| 3,088,609 | 3/1963 | Gerard et al. | 425/405 H X |
| 3,091,804 | 6/1963 | Gerard et al. | 425/405 H X |
| 3,241,188 | 3/1966 | Febbo et al. | 425/405 H X |
| 4,057,383 | 11/1977 | Bettonica | 425/405 H |

FOREIGN PATENT DOCUMENTS

| | | | |
|---|---|---|---|
| 327077 | 1976 | Austria | 425/405 H |
| 1961664 | 6/1971 | Fed. Rep. of Germany | 425/405 H |
| 41-12151 | 1966 | Japan | 425/405 H |

*Primary Examiner*—J. Howard Flint, Jr.

*Attorney, Agent, or Firm*—Kurt Kelman

[57] ABSTRACT

A brickmaking press comprises a segmental ring, a brick shaping mold supported by the segmental ring in the mold cavity defined thereby, a clamping ring surrounding and enclosing the segmental ring, and the clamping and segmental rings defining an annular chamber maintained under fluid pressure.

5 Claims, 3 Drawing Figures

BRICKMAKING PRESS

The present invention relates to improvements in a brickmaking press for making bricks, and more particularly to the type of press comprising a segmental ring defining a mold cavity, a brick shaping mold supported by the segmental ring in the mold cavity, a clamping ring surrounding and enclosing the segmental ring, and the segmental and clamping rings defining an annular chamber therebetween which may be placed under pressure.

Considerable difficulties have been encountered in assembling the structural components of hydraulic and mechanical brickmaking presses for making bricks of magnesite, silica, dolomite, metal powders and like particulate materials. In such presses, the brick shaping molds are built into mold boxes to receive the necessary molding pressures. Rectangular as well as round molding boxes have been used. The round presses have a four-part segmental ring which defines a rectangular mold cavity and the segmental ring is surrounded and enclosed by a clamping ring. Such presses are preferred to the rectangular ones since they are capable of sustaining higher pressures at the same press weight and the mold walls are highly resistant to flexing. The brick shaping mold consists of plates of highly wear resistant, hardened material or plates lined with highly wear resistant, hardened sheet metal. It is built into the mold cavity and must be supported therein so that the mold plates are not moved out of the mold cavity during the brick shaping operation or the subsequent removal of the shaped bricks from the mold. This has been accomplished by wedging the mold plates in the mold cavity or securing them in place by cover plates. Wedging has the disadvantage that it may cause deformation of the clamping ring surrounding the segmental ring, thus causing possible mold deformations during pressing and reducing the capability of the mold to sustain high pressures.

Austrian Pat. No. 327,077 discloses a press of the indicated type wherein an elastic rubber or synthetic resin mass fills the annular chamber between the segmental and clamping rings of the press. This mass may be placed under pressure by a stuffing box which may be pressed against the mass by setting screws or may be pressed directly by threaded bolts acting on the mass. This makes application of a uniform and controllable pressure impossible and, due to friction forces, it is not possible to relieve the mass sufficiently of pressure to enable the mold to be readily moved out of the mold cavity defined by the segmental ring. The ready movement of the mold plates into and out of the mold cavity is, however, an important practical requirement in the industrial operation of such presses.

It is accordingly a primary object of this invention to overcome the disadvantages of conventional brickmaking presses by providing clamping means which place the mold under uniform and controllable tension which will securely hold mold plates in place when molding pressure is applied for shaping the bricks in the molds.

The above and other objects are accomplished in accordance with the invention by providing means for maintaining a fluid pressure in the annular chamber between the segmental and clamping rings of the press.

The objects, advantages and features of the present invention will become more apparent from the following detailed description of certain now preferred embodiments thereof, taken in conjunction with the accompanying schematic drawing wherein FIG. 1 is a section along line X—X of FIG. 2, showing a brick-making press with molds for two bricks;

Figure 1:
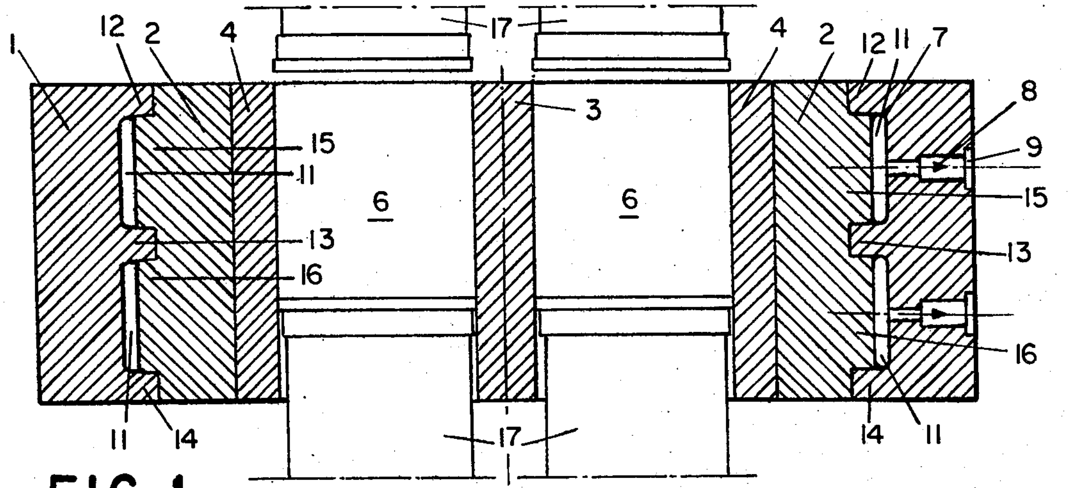
Figure 2:
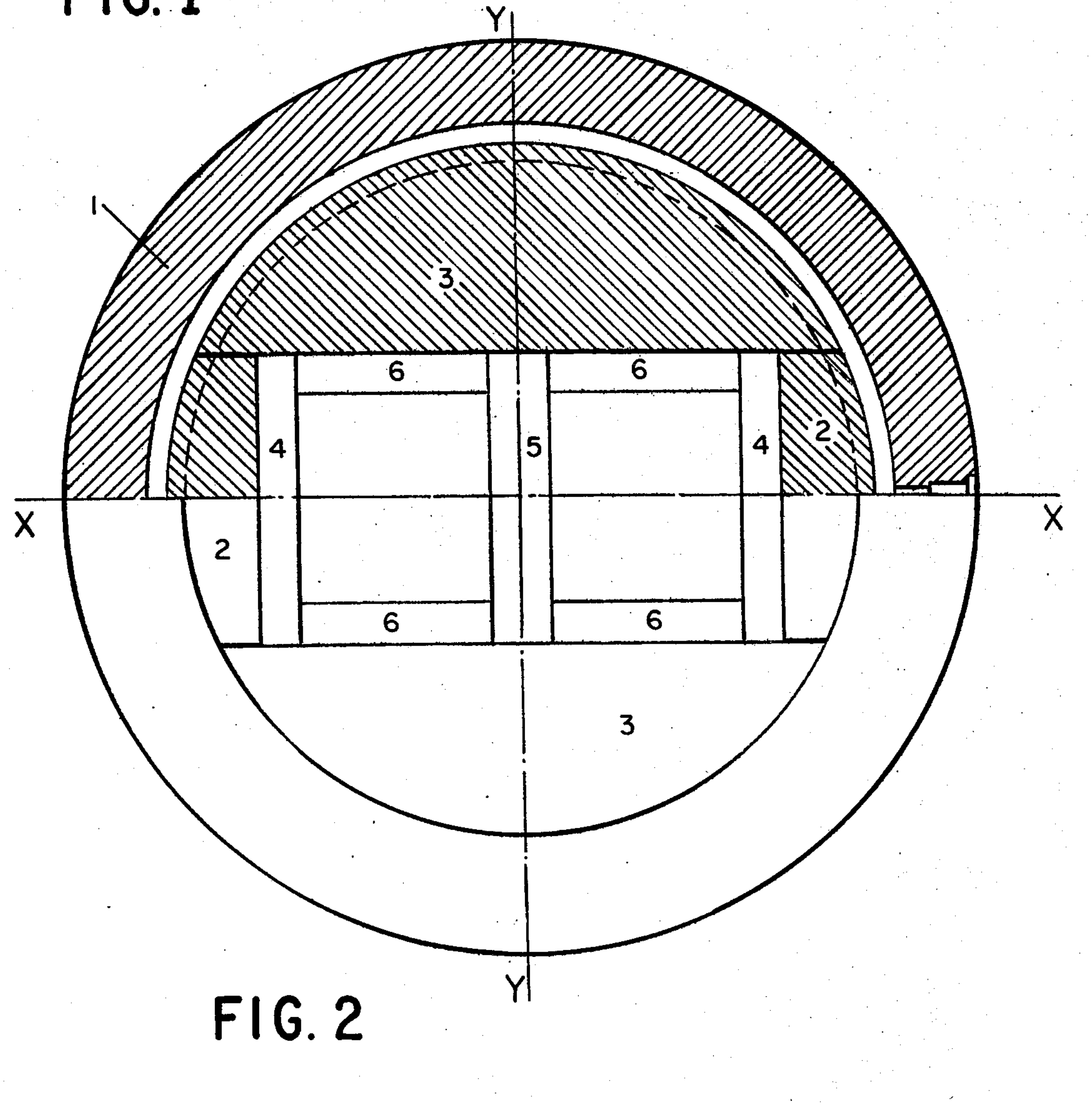
FIG. 2 is a top view of the press of FIG. 1, half in transverse section.

Referring now to the drawing and first to FIGS. 1 and 2, there is shown a brickmaking press comprising a segmental ring consisting of two diametrically opposed segmental ring elements 3 having interposed therebetween diametrically opposed segmental ring elements 2, the four elements forming a segmental ring defining a coaxial rectangular mold cavity. As appears in FIG. 2, there is a slight gap between elements 2 and 3 to enable ring elements 2 to glide radially along the walls of ring elements 3. Clamping ring 1 surrounds and encloses the segmental ring, and the clamping and segmental rings define annular chamber 11 therebetween.

Two brick shaping molds are supported by the segmental ring in the mold cavity, these molds being constituted by mold plates or walls 4, 5 and 6.

In the illustrated embodiments, annular chamber 11 is composed of two superposed compartments, radially extending rib 13 between the segmental ring and clamping ring 1 dividing the annular chamber into the superposed compartments, fixing the segmental ring against axial displacement and guiding it in a radial direction. As shown, the clamping ring has three radially extending rings 12, 13 and 14 wherebetween the two superposed chamber compartments extend in an axial direction, radially extending ribs 15 and 16 projecting outwardly from the segmental ring and being interleaved with inwardly projecting ribs 12, 13 and 14. These interleaved ribs do not only define two closed compartments but also fix the segmental ring elements against axial displacement and secure them for guidance in a radial direction.

The illustrated means for maintaining a fluid pressure in annular chamber 11 comprises expandible bellows 7 mounted in each compartment of the chamber, fluid inlet conduits 9 in clamping ring 1 and connected to the bellows for supplying fluid under pressure to the bellows from a fluid source (not shown), and check valves 8 in the fluid inlets. The bellows may be made of rubber or any other suitable elastic material and the fluid source may be a supply of water, hydraulic oil or air under pressure connected to inlets 9 to deliver the fluid through check valves 8 into the bellows. Stoppers may be provided for closing the fluid inlet conduits when they are disconnected from the fluid source.

Axially movable rams 17 are mounted above and below the molds and, after the molds are filled with a brickmaking material, the rams are operated to exert a molding pressure on the material in the molds and thus to shape the bricks therein while the clamping ring holds the molds in position.

When the press is not in operation, it is useful to substitute a frame for the mold plates 4, 5 and 6 in the mold cavity to maintain the dimensions of the mold cavity and to keep the press under slight tension. When the press is ready to be placed into operation, the mold plates assembled in a mounting frame are slid from the mounting frame directly into the mold cavity with simultaneous displacement of the substitute frame from the mold cavity. The fluid source, for example an oil or air pump, is then connected to fluid inlet conduits 9 to supply fluid pressure to bellows 7. The resultant pressure is transmitted radially outwardly to clamping ring 1 and radially inwardly to the segmental ring wherein the molds are supported. Since segmental elements 2 are radially movable, they will be slightly displaced inwardly under the radial pressure from chamber 11. Thus, the mold plates 4, 5 and 6 will be held under tension in directions X—X and Y—Y by the segmental ring elements 2 and 3. This tension is increased by the fluid pressure in bellows 7 until it suffices to hold the mold plates in position against any displacement by the molding pressure exerted by rams 17.

Figure 3:
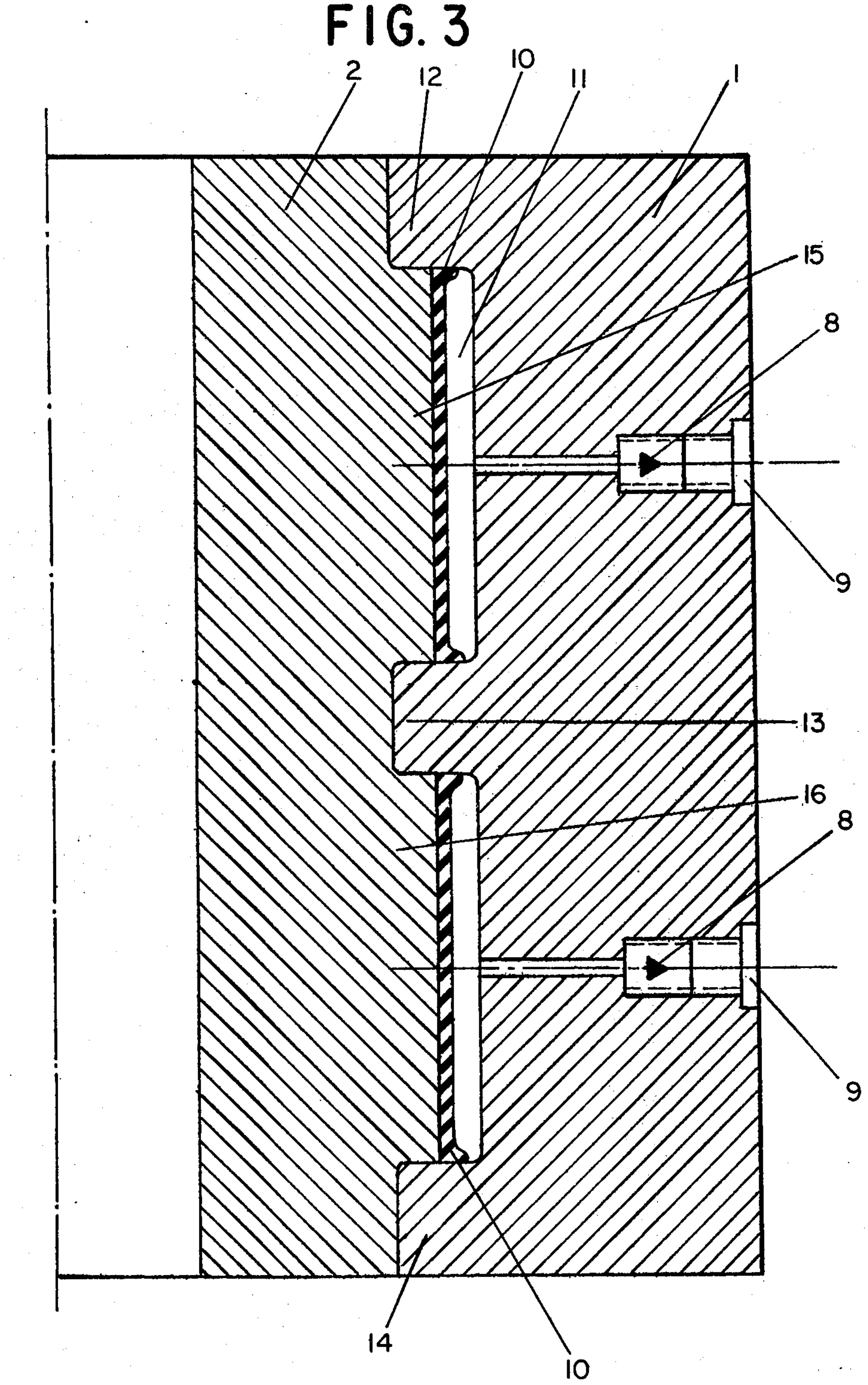
FIG. 3 is an enlarged partial vertical section of a modified embodiment of the press.

In the modified embodiment of FIG. 3, wherein like reference numerals designate like parts operating in a like manner, sealing of annular chamber 11 is improved by annular gaskets 10 surrounding the segmental ring.

The hydraulic or pneumatic clamping pressure exerted upon the mold cavity defining segmental ring according to this invention opens various advantageous possibilities. For instance, it is possible to connect annular chamber 11 or bellows 7 mounted therein by means of a small slide valve to a high pressure storage tank set to maximal pressure or to a pressure limiting valve set to a minimal pre-operational pressure. With such an arrangement, the mold in the press is subjected to the maximal pressure coming from the high pressure storage tank before the mold is filled and remain under this high pressure until the molding pressure has been relieved. Thereafter, but before the rams are removed from contact with the shaped bricks, the press is switched over to the minimal pressure which enables the mold plates to move slightly apart in a direction transverse to the direction of the molding pressure. This reduces the pressure required to load and unload the mold, thus increasing the life of the mold and insuring the parallel arrangement of the mold walls.

While a mold cavity of rectangular cross section has been described and illustrated, the segmental ring elements may be shaped to define round, triangular or randomly polygonal mold cavity cross sections. The shape and nature of the mold is immaterial.

What is claimed is:

1. In a brickmaking press for making bricks, which comprises (a) a segmental ring defining a mold cavity, (b) a brick shaping mold supported by the segmental ring in the mold cavity, and (c) a clamping ring surrounding and enclosing the segmental ring, (1) the clamping and segmental rings defining an annular chamber therebetween; and (d) means for maintaining a fluid pressure in the annular chamber.

2. The brickmaking press of claim 1, wherein the annular chamber is composed of superposed compartments.

3. The brickmaking press of claim 2, further comprising a radially extending rib arranged between the segmental ring and clamping ring, the rib dividing the annular chamber into the superposed compartments, fixing the segmental ring against axial displacement and guiding it in a radial direction.

4. The brickmaking press of claim 1, wherein the means for maintaining the fluid pressure in the annular chamber comprises an expandible bellows mounted in the chamber, a fluid inlet in the clamping ring and connected to the bellows for supplying fluid under pressure to the bellows, and check valve means in the fluid inlet.

5. The brickmaking press of claim 4, further comprising an annular gasket surrounding the segmental ring for sealing the annular chamber.

* * * * *